US008468194B2

(12) United States Patent
Dreyfus et al.

(10) Patent No.: US 8,468,194 B2
(45) Date of Patent: Jun. 18, 2013

(54) EXPERTISE REFERRALS USING A REAL-TIME COMMUNICATION SYSTEM

(75) Inventors: Marc Dreyfus, Brooklyn, NY (US); Asima Silva, Holden, MA (US); Robert C. Weir, Westford, MA (US); Derek S. Lam, Minneapolis, MN (US)

(73) Assignee: International Business Machines Corporation, Armonk, NY (US)

( * ) Notice: Subject to any disclaimer, the term of this patent is extended or adjusted under 35 U.S.C. 154(b) by 674 days.

(21) Appl. No.: 12/345,709

(22) Filed: Dec. 30, 2008

(65) Prior Publication Data

US 2010/0169426 A1    Jul. 1, 2010

(51) Int. Cl.
G06F 15/16    (2006.01)

(52) U.S. Cl.
USPC .................. 709/202; 709/60; 379/216; 705/9

(58) Field of Classification Search
USPC ......................... 709/60, 202; 379/216; 705/9
See application file for complete search history.

(56) References Cited

U.S. PATENT DOCUMENTS

| | | | |
|---|---|---|---|
| 6,829,585 B1* | 12/2004 | Grewal et al. | 705/7.14 |
| 6,901,394 B2* | 5/2005 | Chauhan et al. | 706/60 |
| 6,993,596 B2* | 1/2006 | Hinton et al. | 709/250 |
| 7,596,578 B1* | 9/2009 | Marks | 1/1 |
| 2006/0122850 A1* | 6/2006 | Ward et al. | 705/1 |
| 2007/0133780 A1* | 6/2007 | Berner et al. | 379/265.01 |
| 2008/0040427 A1* | 2/2008 | Shroff et al. | 709/204 |
| 2008/0192639 A1* | 8/2008 | Narayanan et al. | 370/245 |
| 2008/0235005 A1* | 9/2008 | Golan et al. | 704/9 |
| 2009/0006174 A1* | 1/2009 | Lauffer | 705/9 |
| 2009/0012833 A1* | 1/2009 | Kuhlke et al. | 705/9 |
| 2009/0080635 A1* | 3/2009 | Altberg et al. | 379/216.01 |
| 2010/0070554 A1* | 3/2010 | Richardson et al. | 709/202 |

OTHER PUBLICATIONS

Jun Zhang, Yang Ye, Mark S. Ackerman, and Yan Qu; SISN: A Toolkit for Augmenting Expertise Sharing Via Social Networks; Jul. 2007, Springer Berlin/ Heidelberg, vol. 4564, pp. 491-500.*
Erickson et. al., "Socially Translucent Systems: Social Proxies, Persistent Conversation, and the Design of 'Babble'," CHI '99 (1999).
Moreville, "Social Network Analysis", Semantic Studios, <http://semanticstudios.com/publications/semantics/000006.php>, Feb. 21, 2002, (last viewed Dec. 13, 2008).

* cited by examiner

*Primary Examiner* — Thuong Nguyen
(74) *Attorney, Agent, or Firm* — Cuenot, Forsythe & Kim, LLC

(57) ABSTRACT

A computer-implemented method of providing expertise based referrals can include receiving, from a first user, a voucher specifying a second user seeking expertise and a third user as a potential subject matter expert. Responsive to execution of the voucher, an instant messaging session between the second user and the third user can be established and an input from the second user indicating whether a posed question from the second user is resolved can be received. When the posed question is resolved, a role of maven can be assigned to the first user and a role of subject matter expert can be assigned to the third user. A transcript of the instant messaging session between the second user and the third user, a reference to the first user with the assigned role, and a reference to the third user with the assigned role can be stored as part of a referral transaction.

20 Claims, 5 Drawing Sheets

600

| Sam Expert | |
|---|---|
| Referral: | Jane Doe is referring Joe Smith to Sam Expert. Sam, please go ahead. |

605 points to the Referral row.

| Joe Smith | |
|---|---|
| Referral: | Jane Doe is referring Joe Smith to Sam Expert. Joe, please go ahead. |

705 points to the Referral row.

FIG. 7

EXPERTISE REFERRALS USING A REAL-TIME COMMUNICATION SYSTEM

BACKGROUND

The embodiments of the present invention relate to expertise referrals within a computing environment. Identifying individuals that possess a particular type of expertise can be difficult within an organization. In the usual case, static directories are created that list areas of expertise or specialization of the different members of the organization. These directories attempt to map members of the organization, e.g., employees, with subjects. The directories can be made available to others within the organization.

The information contained within these directories can be collected in a variety of different ways. Typically, the information is collected by polling members of the organization, through self-evaluation where members may update their own profiles, etc. These data collection techniques can be less than accurate and further require constant updating, else the directory becomes out of date and of little use.

BRIEF SUMMARY OF THE INVENTION

The embodiments disclosed herein relate to providing expertise based referrals within an organization using a real-time communication system. One embodiment of the present invention can include a computer-implemented method of providing expertise based referrals. The method can include receiving, from a first messaging client associated with a first user, a voucher specifying a second user associated with a second messaging client seeking expertise and a third user associated with a third messaging client as a potential subject matter expert and assigning a role of potential maven to the first user and a role of potential subject matter expert to the third user. Responsive to execution of the voucher, an instant messaging session between the second messaging client and the third messaging client can be established. An input from the second messaging client indicating whether a posed question from the second user is resolved can be received. When the posed question is resolved, the method can include assigning a role of maven to the first user and a role of subject matter expert to the third user, and storing, as part of a referral transaction, a transcript of the instant messaging session between the second messaging client and the third messaging client, a reference to the first user with the assigned role, and a reference to the third user with the assigned role.

Another embodiment of the present invention can include a system for performing expertise based referrals including a processor executing computer-usable program code. The processor can receive, from a first messaging client associated with a first user, a voucher specifying a second user associated with a second messaging client seeking expertise and a third user associated with a third messaging client as a potential subject matter expert. The processor can assign a role of potential maven to the first user and a role of potential subject matter expert to the third user. Responsive to execution of the voucher, the processor can establish an instant messaging session between the second messaging client and the third messaging client and receive an input from the second messaging client indicating whether a posed question from the second user is resolved. When the posed question is resolved, the processor can assign a role of maven to the first user and a role of subject matter expert to the third user. The processor further can store, as part of a referral transaction, a transcript of the instant messaging session between the second messaging client and the third messaging client, a reference to the first user with the assigned role, and a reference to the third user with the assigned role.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 6 is a fourth view of a GUI presented by a messaging client in accordance with another embodiment of the present invention.

FIG. 7 is a fifth view of a GUI presented by a messaging client in accordance with another embodiment of the present invention.

DETAILED DESCRIPTION OF THE INVENTION

Figure 1:
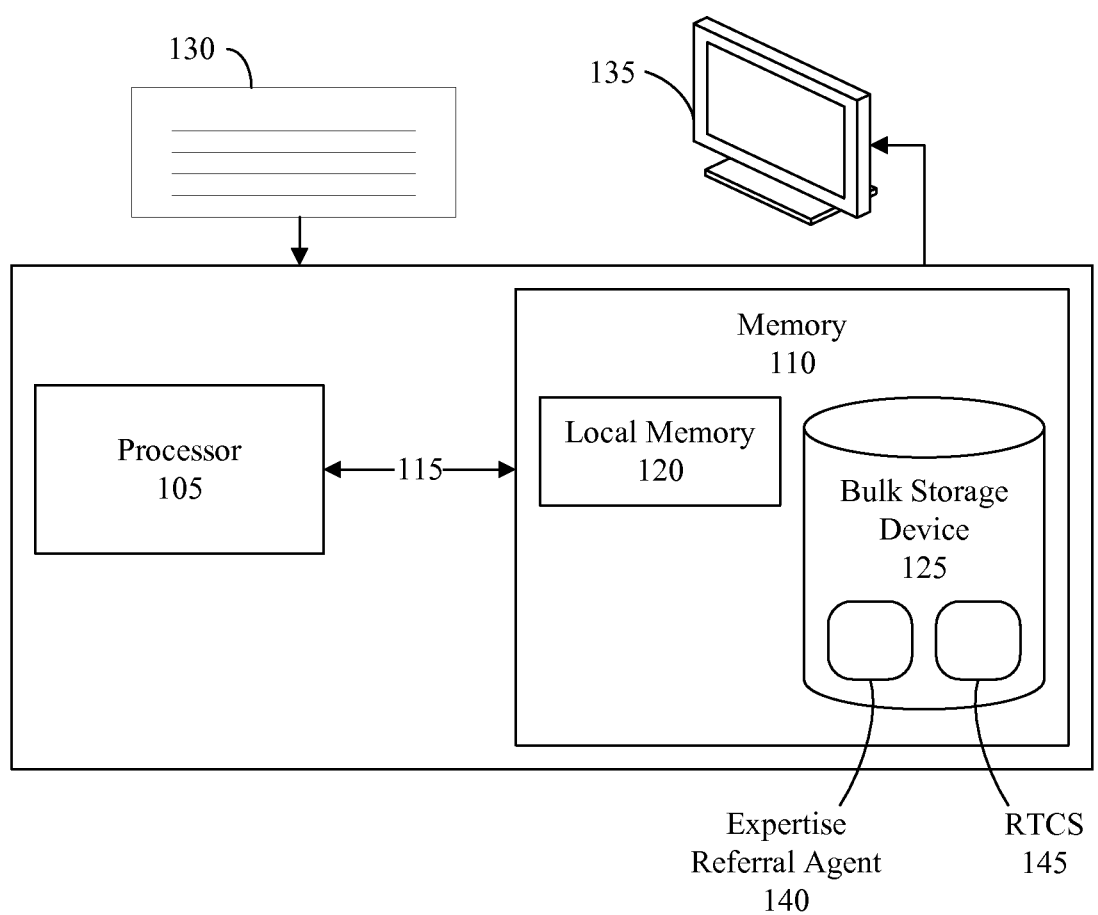
FIG. 1 is a first block diagram illustrating an expertise referral system in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to expertise based referrals. In accordance with the inventive arrangements disclosed herein, expertise referrals can be handled over a real-time communication system. Requests for referrals, and the referrals themselves, can be exchanged over the real-time communication system and tracked. In this manner, individuals with particular expertise can be identified within an organization as expertise information can be dynamically updated as requests for referrals and referrals continue to be exchanged throughout the real-time communication system.

The exchange of referrals through the real-time communication system allows such information to be measured within a community. The collected data can be used to specify associations between individuals and different topics discussed within, or relevant to, the members of the community. Expertise possessed by particular members of the community can be determined from community members providing referrals over the real-time communication system. In this manner, the community itself can generate a set of topics and a taxonomy for the set of topics through the ordinary course of dealing within the system.

In addition to identifying those users that possess particular expertise, the embodiments disclosed herein also identify intermediaries that facilitate the connection of a particular user to another user having the desired expertise. Once the information relating to expertise is gathered, that information can be associated with, or used within, a social networking environment.

FIG. 1 is a block diagram illustrating an expertise referral system (ERS) 100 in accordance with one embodiment of the present invention. ERS 100 can be implemented in the form of a data processing system, e.g., a computer, that is suitable for storing and/or executing program code. Accordingly, ERS 100 can include at least one processor 105 coupled directly or indirectly to memory elements denoted as memory 110 through a system bus 115. Memory 110 can include one or more physical memory devices or elements. The elements can include, for example, local memory 120 employed during actual execution of the program code, e.g., random access memory (RAM), one or more bulk storage devices 125, e.g., a hard drive or other persistent data storage device, and cache memories (not shown) which provide temporary storage of at least some program code in order to reduce the number of times code must be retrieved from bulk storage device 125 during execution.

Input/output (I/O) devices such as a keyboard 130, a display 135, and a pointing device (not shown) optionally can be coupled to ERS 100 as well as one or more other I/O devices. The I/O devices can be coupled to ERS 100 either directly or through intervening I/O controllers. Network adapters also can be coupled to ERS 100 to enable ERS 100 to become coupled to other data processing systems or remote printers or storage devices through intervening private or public networks. Modems, cable modems, and Ethernet cards are just a few of the currently available types of network adapters.

In one embodiment, ERS 100 can be implemented as a server executing expertise referral agent 140. Expertise referral agent 140 can be implemented as server-side, computer program. As shown, expertise referral agent 140 can be stored in memory 110 and be executed by processor 105. By executing expertise referral agent 140, processor 105, and thus ERS 100, can implement the various functions described within this specification in terms of facilitating expertise referrals.

In another embodiment, system 100 can include a real-time communication system (RTCS) 145. RTCS 145 can be implemented as server-side software that, when executed by processor 105, enables real-time communication with one or more different client messaging systems having suitable client messaging software. For example, RTCS 145 can be an instant messaging (IM) server or the like. As used within this specification, the phrase "instant messaging" or "IM" is intended to refer to communications that are real-time in nature. In this regard, text messaging, or any other communication system that can distribute messages in real-time, can be considered to be a form of IM. In one aspect, RTCS 145 can establish communication sessions, e.g., chat sessions or IM sessions, among a plurality of users within which instant messages can be exchanged.

Figure 2:
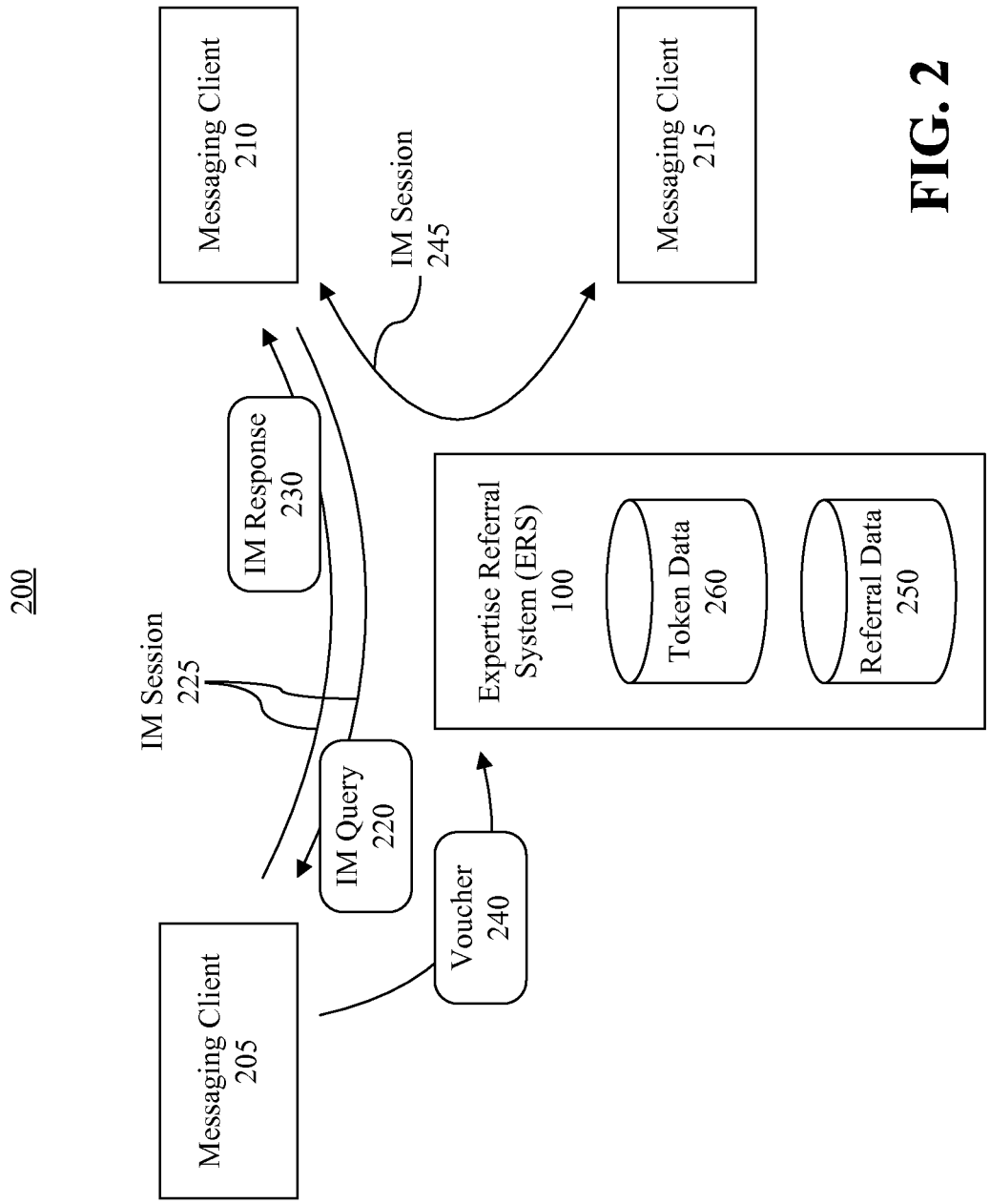
FIG. 2 is a second block diagram illustrating a system for providing expertise referrals in accordance with another embodiment of the present invention.

FIG. 2 is a block diagram illustrating a system 200 for providing expertise referrals in accordance with another embodiment of the present invention. System 200 can include ERS 100 as described with reference to FIG. 1. Like numbers will be used to refer to the same items throughout this specification. ERS 100 can support real-time communication among a plurality of messaging clients 205, 210, and 215 as shown. It should be appreciated that real-time communication among more than three clients can be supported. For example, ERS 100 can support real-time communication among different members of an entire community of users that have been registered with ERS 100 as members. For purposes of illustration, however, only three messaging clients are pictured.

ERS 100 can communicate with messaging clients 205-215 over a communication network (not shown). A communication network over which ERS 100 and messaging clients 205-215 can communicate can be implemented as, or include, without limitation, a WAN, a LAN, the Public Switched Telephone Network (PSTN), the Web, the Internet, and one or more intranets. The communication network further can be implemented as or include one or more wireless networks, whether short or long range, including mobile communication networks.

Each of messaging clients 205-215 can be implemented as a data processing system executing suitable client-side messaging software. Accordingly, each of messaging clients 205-215 can include at least one processor executing the messaging software which can be stored in memory. Each of messaging clients 205-215 will be associated with a particular user that has "logged" into that messaging client and established presence, e.g., a point of presence, with the ERS 100. In this regard, the phrase "messaging client" may be used from time to time within this specification in reference the user, or the identity of the user, that has logged into the particular messaging client being referenced.

In operation, a user of messaging client 210 can send an IM query 220 via ERS 100 to messaging client 205. This action can establish an IM session 225 between messaging clients 205 and 210. IM query 220 can include a question asked by the user of messaging client 210 that is directed at the user of messaging client 205. In this example, the user of messaging client 210 can be referred to as a "seeker" in that the user is seeking an answer to a question posed within IM query 220. In other words, the user of messaging client 210 is seeking particular expertise.

The user of messaging client 205 can send IM response 230, as part of IM session 225, to messaging client 210. IM response 230 can state, for example, that the user of messaging client 205 is unable to answer the question posed in IM query 220, but knows of another user that may have an answer, e.g., the expertise required to provide an answer. A user that is unable to provide the expertise needed, but who has the ability to refer a user, e.g., the seeker, to another user that may possess the necessary expertise to answer the question posed in IM query 220, can be referred to as a "maven."

Responsive to an input from the user of messaging client 205 provided to messaging client 205, messaging client 205 can output a voucher 240. As used herein, "output" or "outputting" can include, but is not limited to, storing a result or other data in memory, e.g., writing to a file, writing a result or other data to a user display or other output device, e.g., playing audible notifications, sending or transmitting a result or other data to another system, exporting, or the like.

Voucher 240 can be a programmatic object that represents a right of one individual, e.g., the seeker, to query another individual, a subject matter expert (SME), about a particular subject or topic. In this example, the user of messaging client 205, e.g., the maven, identifies an SME to messaging client 205 and causes voucher 240 to be output. Voucher 240 can reference the SME, in this case the user of messaging client 215, and the seeker, e.g., the user of messaging client 210. Voucher 240 may also include a reference to IM query 220, or the question posed within IM query 220. It should be appreciated that voucher 240 can include particular items of information or include references to particular items of information. Both cases, as described within this specification, will be referred to as voucher 240 "including" or specifying such information.

In any case, voucher 240 can be output to ERS 100. Upon receipt of voucher 240 within ERS 100, the ERS can create a referral transaction within referral data 250 as a means of storing any data generated in attempting to answer the question posed by the user of messaging client 210. ERS 100, responsive to receiving voucher 240, can establish an IM session 245 between messaging client 210 and messaging client 215. IM session 245 can be independent and separate from IM session 225. That is, messaging client 205 will not be involved in communications between messaging client 210 and messaging client 215. During IM session 245, messaging client 210 and messaging client 215 can communicate, providing the seeker with the opportunity to obtain an answer to the initial question posed in IM query 220 from an SME, in this case the user of messaging client 215.

Each messaging client 205-215, as will be described in greater detail, can output vouchers and also provide feedback as to whether the question posed in IM query 220 has been answered. For example, the seeker of messaging client 210 can provide an input via messaging client 210 indicating whether an answer to IM query 220 was obtained from the SME during IM session 245. Similarly, the SME, through messaging client 215, can provide an input indicating whether the question was answered.

Data generated in reference to voucher 240, as well as voucher 240 itself, can be stored within referral data 250 within a data storage device of ERS 100. For example, such data can be stored in association with the referral transaction created. Such data can be indexed or referenced to the referral transaction, and thus, voucher 240, in this manner. For example, a transcript of IM session 245 and each input from a user indicating whether the initial query was answered can be stored within referral data 250 and referenced to voucher 240 through the referral transaction, e.g., the referral transaction data corresponding to voucher 240.

In another embodiment, voucher 240 can be distributed through ERS 100 to messaging client 210. For example, if the user of messaging client 210 is no longer available, voucher 240 can be stored for later use. Whether stored within ERS 100 or within messaging client 210, subsequently, when executed, voucher 240 can cause ERS 100 to initiate IM session 245. In this regard, vouchers can be associated with a time span over which each voucher is valid. That is, vouchers can be set with expiration dates.

When a user acts in the role of a maven in generating a referral, that user can accumulate one or more tokens. Tokens accumulated by users by taking on the role of maven can be referred to as "mTokens." Accordingly, when a voucher is used, ERS 100 can generate one or more mTokens that can be stored as part of token data 260 within a data storage device of ERS 100. For example, the user of messaging client 205 can accumulate mTokens for referring the user of messaging client 210 to the user of messaging client 215. Accumulation of mTokens can entitle the holder of those tokens to particular rights and/or privileges.

Similarly, when a user takes on the role of SME, that user can accumulate sTokens. The user of messaging client 215 can accumulate or be assigned one or more sTokens for taking on the role of SME in the example of FIG. 2. Like mTokens, accumulation of sTokens can entitle the holder of those tokens to particular rights and/or privileges. ERS 100 can add one or more sTokens to token data 260 for the user of messaging client 215, for example.

In one embodiment, a token threshold can be established. One threshold can be established for mTokens and another threshold established for sTokens. When a user crosses a threshold, that user can be added to a published list of users that are known to be mavens or SMEs as the case may be. In one embodiment, when chatting with a user that has been recognized with maven or SME status through the accumulation of sufficient tokens to surpass one of the thresholds, that user can be denoted or visually acknowledged as such through a visual modification of some aspect of the chat window of the user engaged in an IM session with the maven or SME. Examples of such visual distinctions can include, but are not limited to, color changes, icons as indicia of status, an entirely new user interface, or the like. Further, users can be rewarded as thresholds are crossed.

In another embodiment, the use of tokens and vouchers facilitates the monetization of ERS 100. As noted, vouchers entitle seekers to an inquiry with an SME. Within a free system, e.g., a non-monetized system, vouchers can be held by mavens at the behest of each respective SME. During the referral, the SME can pass the voucher to the maven, who then can distribute the voucher to the seeker. Within a non-monetized system, each voucher can function as an entitlement toward an inquiry with an SME when that SME is not immediately available to communicate with the seeker via an IM session.

Within a monetized system, an SME can limit community access by withholding vouchers from mavens. An SME can provide a predetermined number of vouchers to selected mavens, as determined according to an established policy or according to preference of the SME on a per maven basis. An SME can also, in some cases, provide a voucher to a particular maven upon request of that maven, e.g., when the maven wishes to make a referral but has no vouchers for the preferred SME. It becomes the prerogative of each SME to decide who has access and how long that access is given, e.g., expiration of the voucher. Each SME further may determine how many simultaneous transactions may be allowed at any given time, e.g., how many concurrent IM sessions with seekers are permitted that arise out of a referral from a maven.

Thus, within a monetized system, a seeker can create an account with ERS 100 and deposit credits that can be applied to a cost associated with each voucher. For example, a hierarchy of SMEs can be established, each providing vouchers at different costs that are commensurate with the level of skill of the SME that issues the voucher. Vouchers can carry no actual cash value until the posed question is answered, e.g., resolved. For example, when both the seeker and the SME acknowledge that the question has been answered, the value corresponding to the voucher can be transferred to an account of the SME and/or the maven(s). The split of the value of the voucher between the maven(s) and the SME can be set by a system administrator.

In one embodiment of the present invention, users may be designated as "potential" mavens and "potential" SMEs until such time that the posed question has been resolved. For example, consider the case where the user of messaging client 215 does not have an answer to the question posed in IM query 220. In that case, the user of messaging client 215 may refer the seeker to yet another individual as an SME. Until the question is resolved, the user of messaging client 205 will be considered a potential maven. Similarly, the user of messaging client 215 will be considered a potential SME. When the question is resolved, the status of all involved can be changed from potential maven to maven and from potential SME to SME.

If, however, the user of messaging client 215 refers the seeker to another user as an SME, the status of the user of messaging client 215 will transition from that of potential SME to that of potential maven. Logic can be included in the ERS 100 to track the trail of multiple forwards of a referral to ensure that the expertise referral transaction does not enter into a repeating loop with circular references.

In such an embodiment, roles will not be set and tokens will not be issued until such time that the question is resolved. In this example, the user of messaging client 215 would receive mTokens, not sTokens. In any case, each user involved in the referral, the role of that user, and any data specified in relation to the posed question in terms of explanation, supporting documentation, IM transcripts, can be stored within referral data 250 as part of the referral transaction created for voucher 240.

In one embodiment, the various messages distributed among the messaging clients, whether including vouchers or the like, can be sent in the form of instant messages via the RTCP included within ERP 100. In another embodiment, different messaging techniques or protocols can be used to support and facilitate the establishment of IM sessions as described within this specification.

Figure 3:
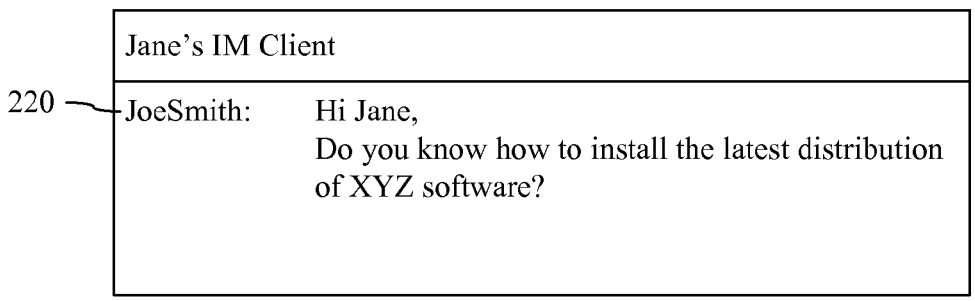
FIG. 3 is a first view of a graphical user interface GUI presented by a messaging client in accordance with another embodiment of the present invention.

FIG. 3 is a view of a graphical user interface (GUI) 300 presented by a messaging client in accordance with another embodiment of the present invention. More particularly, FIG. 3 illustrates the view presented by messaging client 210 of FIG. 2, which belongs to the user "Jane Doe." For example, GUI 300 illustrates a chat window that can be opened. Jane Doe, in the examples to follow, takes on the role of potential maven. As shown, IM query 220 from a seeker, in this example named "Joe Smith," is presented.

Figure 4:
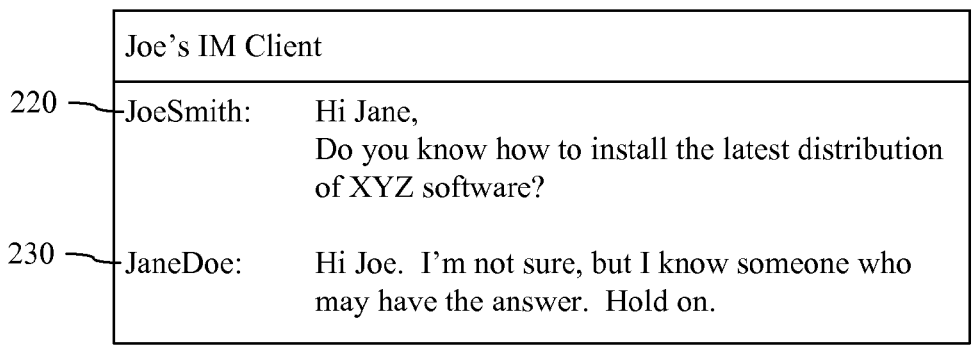
FIG. 4 is a second view of a GUI presented by a messaging client in accordance with another embodiment of the present invention.

FIG. 4 is a view of a GUI 400 presented by a messaging client in accordance with another embodiment of the present invention. More particularly, FIG. 4 illustrates the view presented by messaging client 205 of FIG. 2, e.g., a chat window, which belongs to the seeker Joe Smith. GUI 400 illustrates the presentation of Joe Smith's initial question which was sent as IM query 220 and IM response 230 from Jane Doe.

Figure 5:
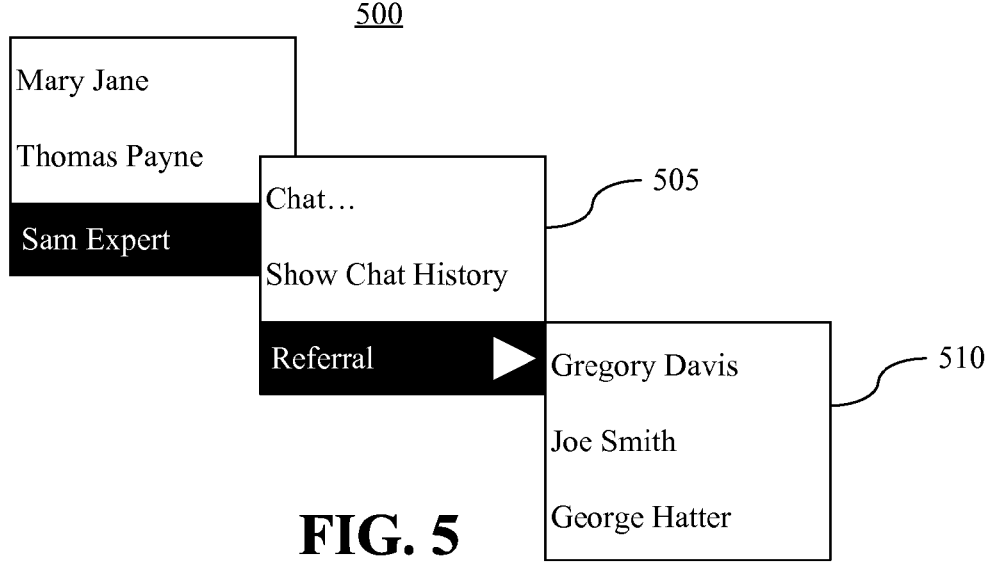
FIG. 5 is a third view of a menu structure presented by a messaging client to generate a referral in accordance with another embodiment of the present invention.

FIG. 5 is a view of a menu structure presented by a messaging client to generate a referral in accordance with another embodiment of the present invention. In this example, potential maven Jane Doe has provided a user input to her messaging client indicating that she would like to provide a referral. Jane Doe can select a person that she thinks will be able to answer the question posed by Joe Smith. Accordingly, Jane Doe can select that particular user from an address book maintained by the messaging client. For example, the name can be selected from a list of members of the organization that are registered with the IM system, a list of users that have logged in, or a list of users that are listed as being "available" within the ERS.

For example, Jane Doe may "right click" on the desired name of "Sam Expert." Here, Jane Doe, acting as a potential maven, determines that the user "Sam Expert" is likely to have the expertise needed to answer the question posed by the seeker Joe Smith. Thus, the referral act or process can begin with the selection of the person, e.g., the SME, to which the seeker will be referred. Responsive to selecting "Sam Expert" and providing a further user input, e.g., a right click, a menu 505 can be presented. As shown, the menu option "Referral" can be selected.

After selecting the "Referral" menu option in menu 505, a list of names 510 can be presented. The list of names can be a list of each user with whom Jane Doe is currently carrying on an IM session. In this example, Jane Doe is engaged in three different IM sessions. One IM session is with a user named "Gregory Davis." Another IM session is with the seeker "Joe Smith." The third IM session is with a user named "George Hatter." Since Joe Smith is the seeker, Jane Doe can select the user named "Joe Smith." Responsive to that selection, the messaging client of Jane Doe can generate and/or output a voucher. The voucher will identify Jane Doe as the maven, Joe Smith as the seeker, and Sam Expert as the SME. As noted, Jane Doe can be initially considered a potential maven and Sam Expert initially considered a potential SME.

In another embodiment, an activatable control can be included within each user's chat window. Responsive to activating that control, a selected transcript of an IM session can be specified and associated with or included within the voucher. In this example, selecting the control can select the IM transcript illustrated in GUI 400 of FIG. 4. The IM transcript can be included or associated with the voucher output from the messaging client corresponding to the maven Jane Doe.

FIG. 6 is a view of a GUI 600 presented by a messaging client in accordance with another embodiment of the present invention. More particularly, FIG. 6 illustrates the view presented by messaging client 215 of FIG. 2, e.g., a chat window, which belongs to the user "Sam Expert." In this example, the user named Sam Expert is the SME. FIG. 6 illustrates that responsive to execution of the voucher, whether immediately upon its being provided to the ERS or at some later time prior to the expiration of the voucher, an IM session, e.g., IM session 245, can be established. Here, the ERS has established IM session 245 and sent a first message 605 to Sam Expert. Message 605 informs Sam Expert that he has been designated as an SME or a potential SME in a referral from Jane Doe to Joe Smith.

FIG. 7 is a view of a GUI 700 presented by a messaging client in accordance with another embodiment of the present invention. More particularly, FIG. 7 illustrates a view presented by messaging client 210 of FIG. 2, e.g., a chat window, which belongs to the seeker "Joe Smith." FIG. 7 illustrates that responsive to execution of the voucher and the establishment of IM session 245, a further IM session window, e.g., GUI 700, can be opened in messaging client 210. GUI 700 illustrates that IM session 245 occurs only between the SME and the seeker. The maven, Jane Doe, is not included in IM session 245. Here, the ERS has established IM session 245 and sent a first message 705 to Joe Smith. Message 705 informs Joe Smith that he has been connected to Sam Expert as the SME to resolve the initial query sent to Jane Doe.

Figure 8:
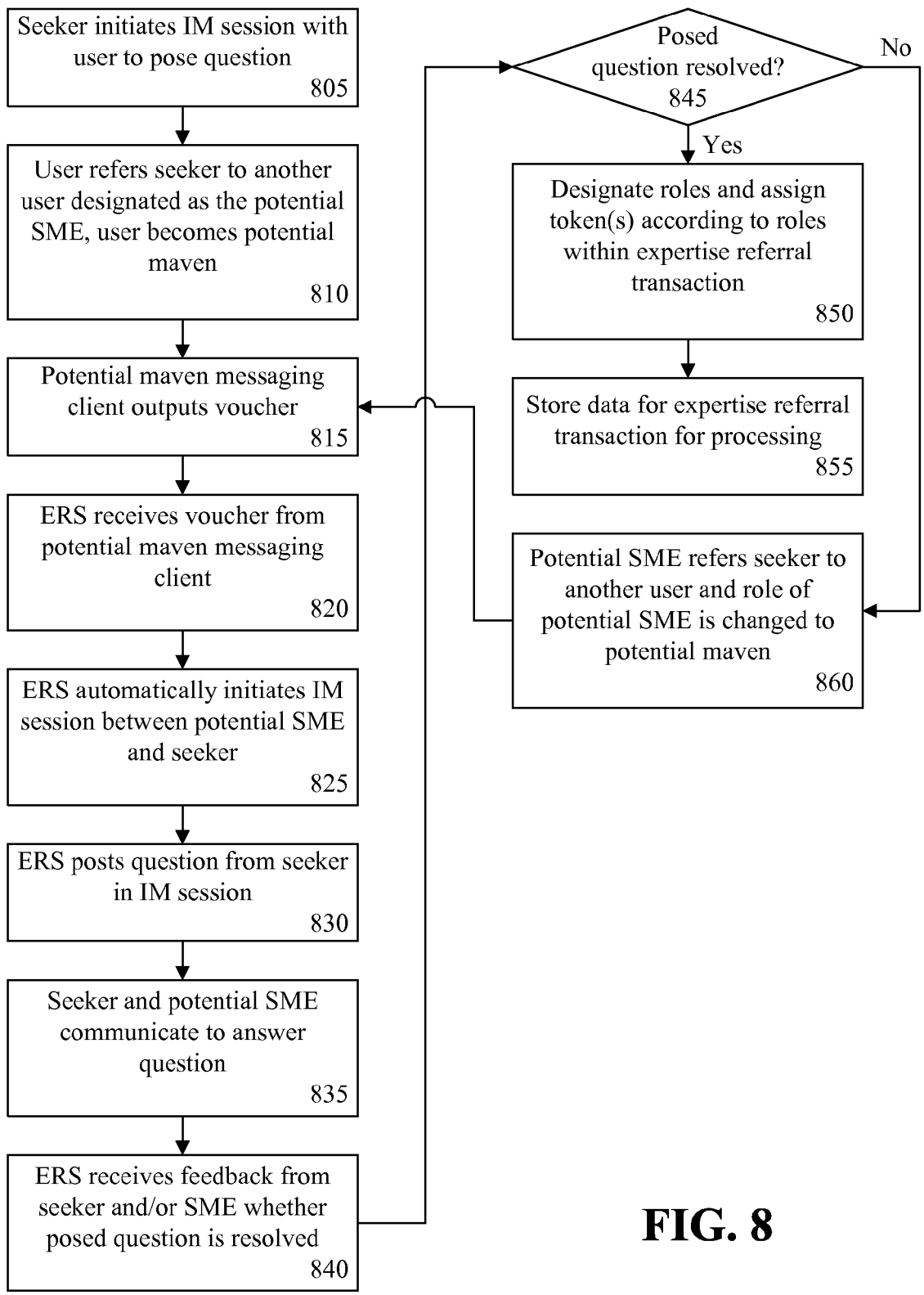
FIG. 8 is a flow chart illustrating a method of providing expertise based referrals in accordance with another embodiment of the present invention.

FIG. 8 is a flow chart illustrating a method 800 of providing expertise based referrals in accordance with another embodiment of the present invention. Method 800 can be performed by a system as described with reference to FIGS. 1-7. Accordingly, method 800 can begin in step 805 where a seeker can initiate an IM session with another user. During that IM session, the seeker can pose a question to the other user. In the event that the other user does not know the answer to the question posed, the user can refer the seeker to another user.

In step 810, the user that was initially contacted for an answer to the posed question can become a potential maven and refer the seeker to another user. The potential maven can select another user from a community of users available within the potential maven's messaging client and request a referral to the selected user, e.g., the potential SME. In one aspect, prior to requesting the referral to the potential SME, the potential maven can confirm the availability of the potential SME, e.g., according to a published calendar of the potential SME, the status of the potential SME within an instant messaging system, etc.

Accordingly, in step 815, the messaging client of the potential maven can output a voucher. As noted, the voucher can include a variety of information that describes the expertise referral transaction that being conducted. For example, as noted, the voucher can specify the potential maven, the seeker, and the potential SME. The voucher further can include a copy or reference to the posed question. In one aspect, only the posed question can be specified by the voucher. In another aspect, a copy of the transcript between the seeker and the potential maven, or a portion of the transcript, can be specified by the voucher. The voucher further can be used to reference associated electronic mails, log files, documents, etc., relating to the posed question or issue. For example, in one embodiment, the potential maven can attach and provide such supplemental information via his or her messaging client for association with, or inclusion within, the voucher that is being output.

In step 820, the ERS can receive the voucher from the messaging client of the potential maven. The ERS can create an entry for a referral transaction within the referral data, within which any data generated through the referral process can be stored. As noted, the voucher effectively grants or conveys to the seeker the right to establish an IM session with the potential SME that lasts for the life of the voucher. In one embodiment, the voucher can be forwarded to the ERS only when the potential SME is available. When the potential SME is not available, the voucher can be automatically delivered via the ERS to the messaging client of the seeker for storage within that messaging client. In that case, though an IM session may not be initiated immediately between the seeker and the potential SME, a summary description associated with the voucher can be made available to the potential SME so that the potential SME can review the issue at his or her convenience prior to joining any IM session with the seeker. The supplemental information can also be made available to the potential SME.

In another embodiment, the potential SME may take no action, e.g., not respond within a specified period of time. In that case, the voucher can expire. As the posed question was resolved, no roles will be assigned to the different participants in the expertise referral transaction. Further, no tokens will be awarded. Any information relating to the posed question will not be added to the referral transaction data. In another embodiment, the referral transaction data corresponding to the voucher can be purged from the referral data.

In step 825, the ERS can automatically initiate an IM session between the potential SME and the seeker. For example, responsive to receiving the voucher when the potential SME is available, the IM session can be automatically initiated. When the potential SME is not available, the IM session can be automatically initiated by the ERS at a time when the ERS determines that both the seeker and the potential SME are available or responsive to the seeker executing the voucher stored within his or her messaging client. In another aspect, when the seeker is not available when the voucher is issued, the voucher can be distributed to the seeker via electronic mail rather than in the form of an instant message.

When the IM session is established between the seeker and the potential SME, the chat window that is opened within the messaging client of the seeker and the potential SME can include text that is provided by the ERS. The text, and/or the appearance of the window that opens, can be visually distinguished from other text or windows used for IM sessions and, as such, can indicate that this is an expert referral and that the ERS is involved in the establishment of the IM session. The ERS can include the posed question from the seeker within the IM session in step 830. That is, the ERS can send a message including explanatory text to the potential SME providing the reason for the IM session and possibly the question to be discussed. Similarly, the ERS can send a message including explanatory text to the seeker providing the reason for the IM session and possibly the question to be discussed. Accordingly, both the seeker and the potential SME will see explanatory text from the ERS and optionally the posed question. Any supplemental data of the expertise referral transaction, e.g., other IM transcripts, a summary, electronic mails, and/or other documents may also be provided through the established IM session. For example, such data can be translated into a text format and sent in the form of one or more instant messages to the seeker and/or the potential SME.

In step 835, the seeker and the potential SME can engage in communication, e.g., bidirectional communication through the IM session. The seeker and the potential SME may add further supplemental data to the question as part of the IM session. When added, that supplemental data can be associated with the question and can be stored as part of the referral transaction.

At some point, the either the seeker, the potential SME, or both can provide an input, e.g., feedback, through each user's individual messaging client to the ERS indicating whether the posed question has been answered. In one embodiment, the question can be considered resolved when both the seeker and the potential SME are in agreement that an answer that is satisfactory to both parties has been determined or provided by the potential SME.

In step 845, when the posed question has been determined to be resolved according to the feedback received from both the seeker and the potential SME, the method can continue to step 850. When the posed question has not been resolved, the method can proceed to step 860.

In step 850, the ERS can assign roles to each user involved in the referral transaction and assign tokens as may be required. For example, the potential maven can be designated as a maven. The potential SME can be designated as an SME. Each maven and SME further can be allocated an appropriate number of tokens of the appropriate type. In step 855, the data relating to the expertise referral transaction can be stored for processing. The data can include, for example, any IM transcripts generated whether between seeker and potential mavens or between seeker and potential SMEs, electronic documents exchanged during any IM session or attached to the voucher, any supplemental data specified by a maven, a seeker, or an SME, etc.

When the posed question has been resolved, there is no need to forward the referral to another potential SME. If, however, the potential SME explicitly indicates that he or she is unable to answer the question posed, the posed question is not resolved and the method can continue to step 860 to refer the seeker to another potential SME.

In the event of mixed reviews or a disagreement between the seeker and the potential SME, the method also can continue to step 860 as well. In that case, however, roles and tokens may be allotted based upon a predetermined policy in the ERS. For example, the use of tokens allows an organization to use a monetization model in connection with the ERS. Within a monetized system, the voucher can be consumed or partially consumed, can be apportioned or allocated among potential mavens, mavens, potential SMEs, or the SME per policy to prevent seekers from obtaining answers to questions and then indicating dissatisfaction to avoid payment. Within a monetized system, a portion of the cost of accessing the SME can be refunded to the seeker, for example.

In step 860, the potential SME can refer the seeker to another user as a new potential SME. As shown, the role of the potential SME to which the seeker was initially referred can be changed to that of potential maven. If, or when, the question is resolved, the original potential SME can be given mTokens with each other maven.

In another embodiment of the present invention, the seeker's acknowledgement of obtaining a satisfactory answer can trigger a process in the ERP that analyzes the content of the data stored in reference to the referral transaction. For example, the content of the communication between the seeker and the SME can be analyzed for keywords and they like that can be associated with the data and used within another social network or a tagging system to reference the IM transcript. Users, e.g., the seeker and the SME, may also manually associate keywords or tags with the referral transaction data.

In another arrangement, the referral transaction data can be stored until such time that the SME involved accumulates sufficient sTokens, e.g., a number of sTokens that exceeds a threshold. Upon exceeding the threshold, the referral transaction data can be published to a location or Web site that is accessible by the community of users registered with the ERS.

The embodiments described herein are provided for purposes of illustration only and are not intended as limitations of the embodiments disclosed. Further aspects of the embodiment can include providing the ability to delegated referrals, e.g., vouchers, to another community member. Any referrals to a potential SME or an SME that has delegated responsibility can be directed to the person to whom the SME or potential SME has delegated responsibility. For example, a delegate can be used when the SME or potential SME is not currently available. In this regard, the ERP can perform the delegation and routing automatically upon receiving a voucher specifying an SME or potential SME that is not available and that has specified a delegate. Community participants may also opt out of receiving referrals completely if so desired.

Other aspects of the embodiments disclosed herein can include tracking referrals by success of the referral as rated by the person being referred and tracking referrals and determining those individuals receiving the most referrals and from whom, providing a display that visualizes highly rated mavens and/or SMEs according to accumulated tokens.

The embodiments described within this specification describe various mechanisms to capture the flow of information among members of an organization. Once acquired, that information can be indexed according to keyword, tagged, or otherwise correlated with various topics. The information also can be utilized and/or presented in a variety of ways. For example, the information collected relating to mavens, seekers, and SMEs can be illustrated in graph form indicating the separation of, and clustering of, different users within an organization. The information can be queried using a conventional database type of configuration. Regardless, once the information is collected, it can be presented and queried in any of a variety of ways to identify mavens, SMEs, clusters of mavens, SMEs, and generally evaluate how information flows among users within the organization and identify centers of expertise.

The flowchart(s) and block diagram(s) in the figures illustrate the architecture, functionality, and operation of possible implementations of systems, methods, and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of providing expertise based referrals, the method comprising:
   receiving, from a first messaging client associated with a first user, a voucher specifying a second user associated with a second messaging client seeking expertise and a third user associated with a third messaging client as a potential subject matter expert, wherein the voucher is a programmatic object representing a right of an individual to query another about a particular subject or topic;
   assigning a role of potential maven to the first user and a role of potential subject matter expert to the third user;
   responsive to execution of the voucher, establishing an instant messaging session between the second messaging client and the third messaging client;
   receiving an input from the second messaging client indicating whether a question posed by the second user is resolved; and
   when the question is resolved, assigning a role of maven to the first user and a role of subject matter expert to the third user, and storing, as part of a referral transaction, a transcript of the instant messaging session between the second messaging client and the third messaging client, a reference to the first user with the assigned role, and a reference to the third user with the assigned role.

2. The computer-implemented method of claim 1, wherein responsive to execution of the voucher, establishing an instant messaging session between the second messaging client and the third messaging client comprises establishing the instant messaging session only with the second messaging client and the third messaging client, wherein the first user is excluded from the instant messaging session.

3. The computer-implemented method of claim 1, further comprising:
   receiving an input from the third messaging client indicating that the third user is unable to provide an answer to the posed question; and
   receiving, from the third messaging client, a further voucher specifying the second user and a fourth user as a potential subject matter expert, wherein the further voucher is associated with the referral transaction.

4. The computer-implemented method of claim 3, further comprising:
   expiring the voucher;
   assigning a role of potential maven to the first user; and
   replacing the role of potential subject matter expert for the third user with the role of potential maven.

5. The computer-implemented method of claim 1, wherein responsive to execution of the voucher, establishing an instant messaging session between the second messaging client and the third messaging client further comprises:
   sending an automated message to the second messaging client indicating the establishment of the instant messaging session with the third user as a potential subject matter expert; and
   sending an automated message to the third messaging client indicating the establishment of the instant messaging session with the second user as the seeker.

6. The computer-implemented method of claim 1, further comprising, responsive to determining that the posed question is resolved, expiring the voucher.

7. The computer-implemented method of claim 1, further comprising monetizing the referral transaction by selectively assigning tokens to users assigned a role of maven and users assigned a role of subject matter expert according to the resolution of the posed question.

8. The computer-implemented method of claim 1, further comprising allocating a predetermined number of vouchers from the third user to the first user, wherein each voucher allocated from the third to the first user is usable by the first user in referring a seeker to the third user.

9. A system for performing expertise based referrals, the system comprising:
a processor executing computer-usable program code, wherein the processor:
receives, from a first messaging client associated with a first user, a voucher specifying a second user associated with a second messaging client seeking expertise and a third user associated with a third messaging client as a potential subject matter expert, wherein the voucher is a programmatic object representing a right of an individual to query another about a particular subject or topic;
assigns a role of potential maven to the first user and a role of potential subject matter expert to the third user;
responsive to execution of the voucher, establishes an instant messaging session between the second messaging client and the third messaging client;
receives an input from the second messaging client indicating whether a question posed by the second user is resolved; and
when the posed question is resolved, assigns a role of maven to the first user and a role of subject matter expert to the third user, and stores, as part of a referral transaction, a transcript of the instant messaging session between the second messaging client and the third messaging client, a reference to the first user with the assigned role, and a reference to the third user with the assigned role.

10. The system of claim 9, wherein responsive to execution of the voucher, the processor establishes an instant messaging session between the second messaging client and the third messaging client by establishing the instant messaging session only with the second messaging client and the third messaging client, wherein the first user is excluded from the instant messaging session.

11. The system of claim 9, wherein the processor further:
receives an input from the third messaging client indicating that the third user is unable to provide an answer to the posed question; and
receives, from the third messaging client, a further voucher specifying the second user and a fourth user as a potential subject matter expert, wherein the further voucher is associated with the referral transaction.

12. The system of claim 11, wherein the processor further:
expires the voucher;
assigns a role of potential maven to the first user; and
replaces the role of potential subject matter expert for the third user with the role of potential maven.

13. The system of claim 9, wherein responsive to execution of the voucher, and establishing an instant messaging session between the second messaging client and the third messaging client, the processor further:
sends an automated message to the second messaging client indicating the establishment of the instant messaging session with the third user as a potential subject matter expert; and
sends an automated message to the third messaging client indicating the establishment of the instant messaging session with the second user as the seeker.

14. The system of claim 9, wherein the processor, responsive to determining that the posed question is resolved, expires the voucher.

15. The system of claim 9, wherein the processor further monetizes the referral transaction by selectively assigning tokens to users assigned a role of maven and users assigned a role of subject matter expert according to the resolution of the posted question.

16. The system of claim 9, wherein the processor, allocates a predetermined number of vouchers to the first user from the third user, wherein each voucher allocated from the third to the first user is usable by the first user in referring a seeker to the third user.

17. A computer program product comprising:
a non-transitory computer-usable storage comprising non-transitory computer-usable program code stored thereon that, when executed by a computer, provides expertise based referrals, the non-transitory computer-usable storage comprising:
non-transitory computer-usable program code that receives, from a first messaging client associated with a first user, a voucher specifying a second user associated with a second messaging client seeking expertise and a third user associated with a third messaging client as a potential subject matter expert, wherein the voucher is a programmatic object representing a right of an individual to query another about a particular subject or topic;
non-transitory computer-usable program code that assigns a role of potential maven to the first user and a role of potential subject matter expert to the third user;
non-transitory computer-usable program code that, responsive to execution of the voucher, establishes an instant messaging session between the second messaging client and the third messaging client;
non-transitory computer-usable program code that receives an input from the second messaging client indicating whether a posted question from the second user is resolved; and
non-transitory computer-usable program code that, when the posed question is resolved, assigns a role of maven to the first user and a role of subject matter expert to the third user, and stores, as part of a referral transaction, a transcript of the instant messaging session between the second messaging client and the third messaging client, a reference to the first user with the assigned role, and a reference to the third user with the assigned role.

18. The computer program product of claim 17, wherein the non-transitory computer-usable program code that, responsive to execution of the voucher, establishes an instant messaging session between the second messaging client and the third messaging client further comprises:
non-transitory computer-usable program code that sends an automated message to the second messaging client indicating the establishment of the instant messaging session with the third user as a potential subject matter expert; and
non-transitory computer-usable program code that sends an automated message to the second messaging client indicating the establishment of the instant messaging session with the third user as a potential subject matter expert.

19. The computer program product of claim 17, wherein the non-transitory computer-usable storage further comprises non-transitory computer-usable program code that monetizes the referral transaction by selectively assigning tokens to users assigned a role of maven and users assigned a role of subject matter expert according to the resolution of the posed question.

20. The computer program product of claim 17, wherein the non-transitory computer-usable storage further comprises non-transitory computer-usable program code that allocates a predetermined number of vouchers from the third user to the first user, wherein each voucher allocated from the third to the first user is usable by the first user in referring a seeker to the third user.

* * * * *